United States Patent [19]

Gramm

[11] Patent Number: 4,498,455
[45] Date of Patent: Feb. 12, 1985

[54] GLAZING MATERIAL

[76] Inventor: Ronald J. Gramm, 113 Snowden Dr., Pittsburgh, Pa. 15229

[21] Appl. No.: 207,449

[22] Filed: Nov. 17, 1980

[51] Int. Cl.³ .............................................. G02B 17/00
[52] U.S. Cl. .................................... 126/417; 126/439; 126/450; 350/263; 350/264
[58] Field of Search ........................ 126/439, 450, 417; 350/258, 259, 260, 263, 264

[56] References Cited

U.S. PATENT DOCUMENTS 4,076,015  2/1978  Mattson ................................ 126/449
4,257,403  3/1981  Chevalier ............................ 126/449
4,337,754  7/1982  Conger ................................ 126/439

FOREIGN PATENT DOCUMENTS 2552598  6/1977  Fed. Rep. of Germany ...... 126/439

Primary Examiner—Albert J. Makay
Assistant Examiner—Henry Bennett

[57] ABSTRACT

A glazing material for the selected admittance, absorption and reflection of radiant solar energy consists of two series of planar members contiguously and alternately disposed along a common plane in an angled relation to each other, which members define a transparent zone for the admittance therethrough of radiant solar energy and an opaque zone whereby solar energy contacting one side of the opaque zone is absorbed and radiant solar energy contacting the opposite side thereof is reflected. Dual glazed embodiments of the invention which may provide one or more insulating air pockets are also described.

7 Claims, 11 Drawing Figures

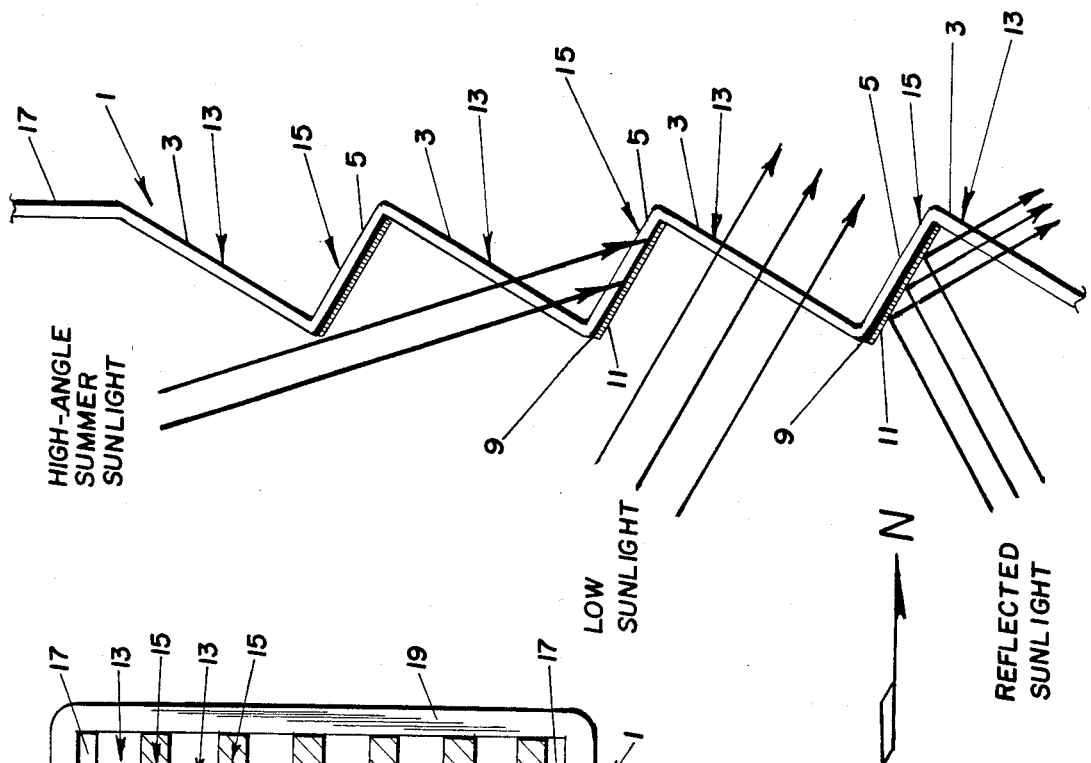
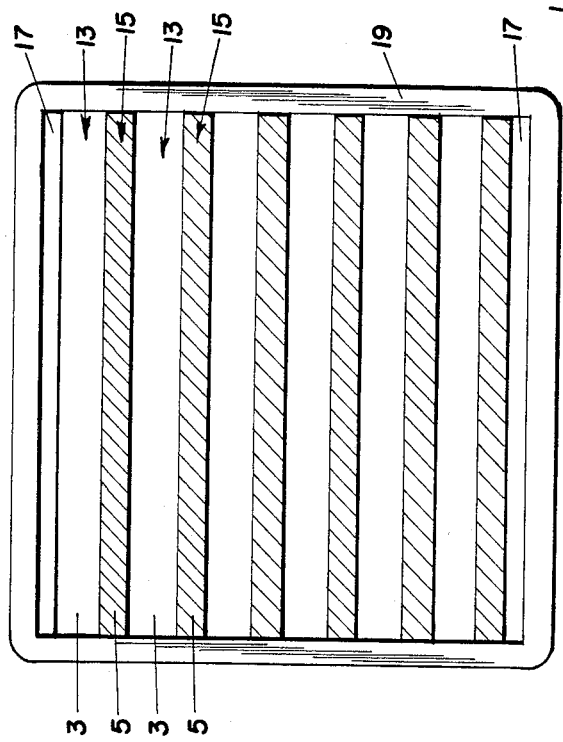
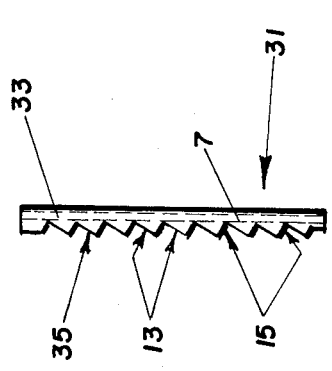
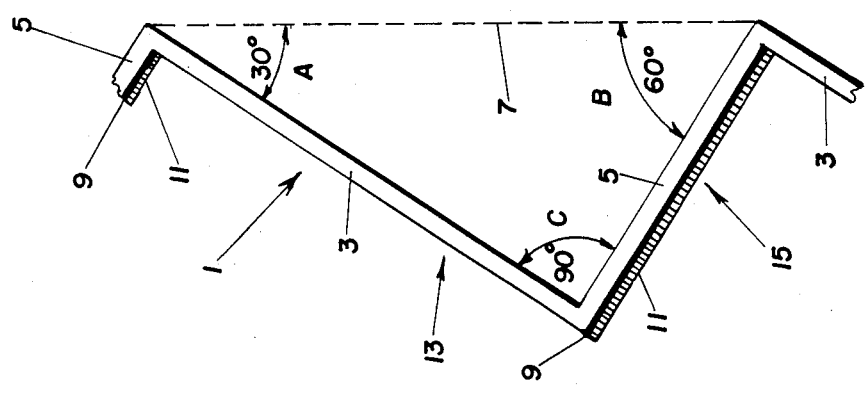
Fig. 6
Fig. 2
Fig. 5
Fig. 1

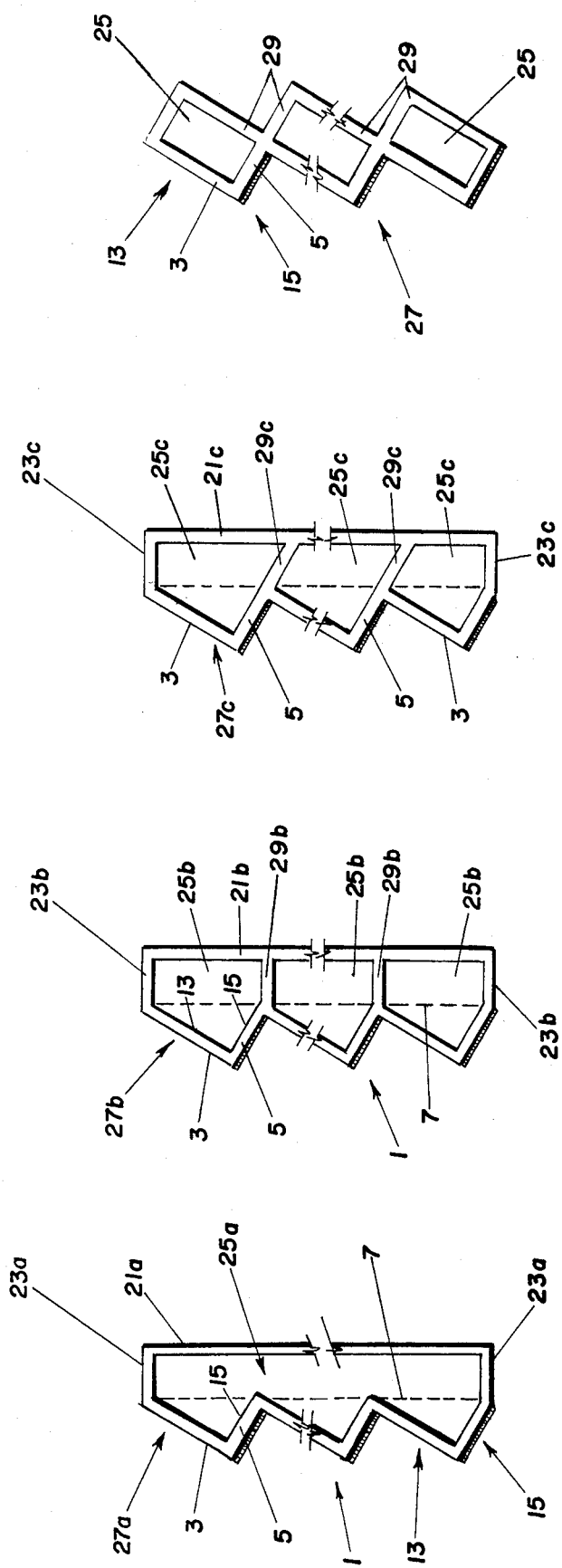

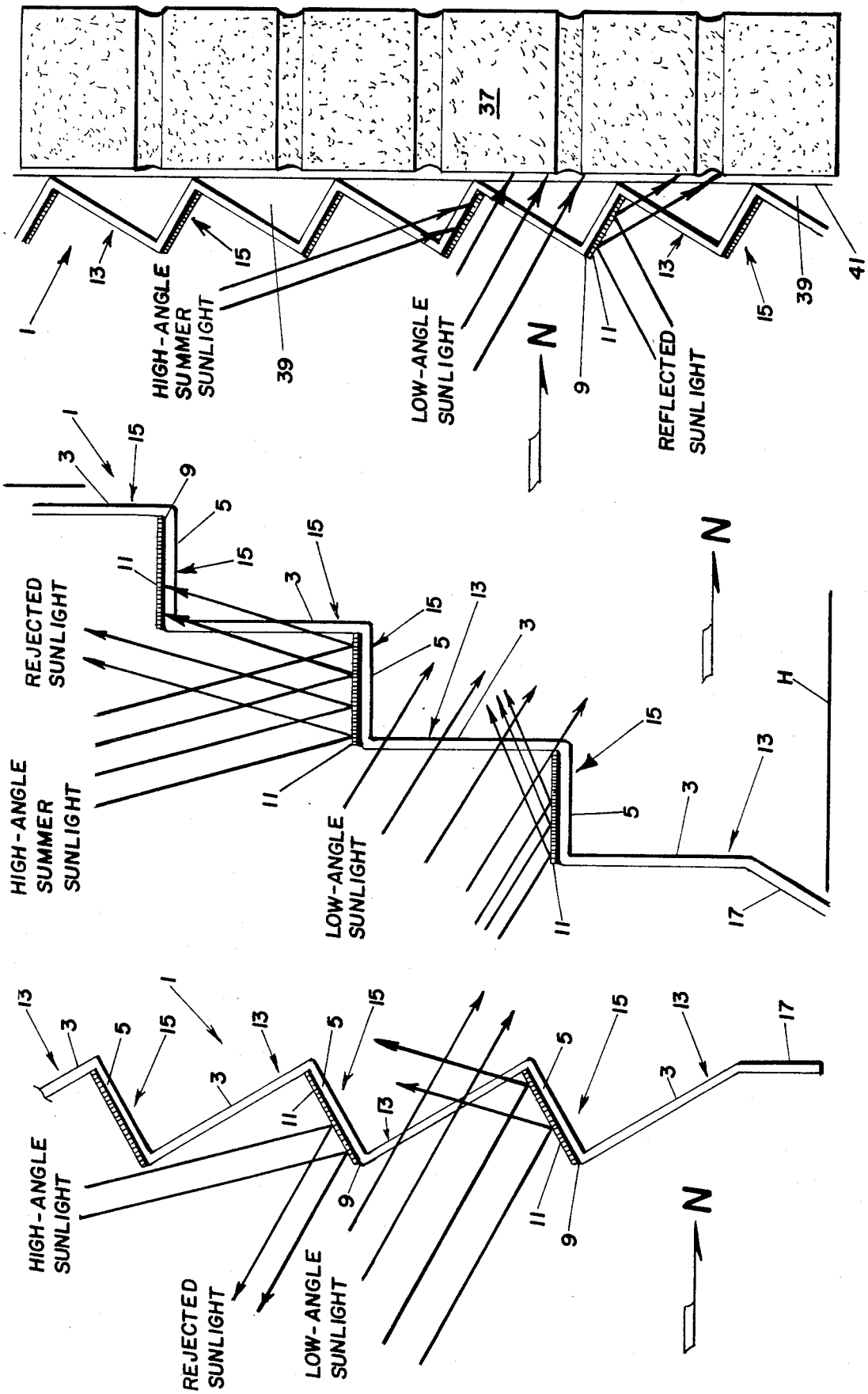

GLAZING MATERIAL

FIELD OF THE INVENTION

The invention relates to a glazing material for the automatic selected admittance, absorption and reflection of radiant solar energy.

BACKGROUND OF THE INVENTION

A great deal of effort is being expended to develop devices and systems which utilize solar energy. While it is critically important that the maximum use of solar radiant energy be achieved, it is equally important to recognize the fact that there are times when it would be more advantageous to simply selectively reject a portion of the solar energy available. For example, in the northern latitudes, the long summer days and the high sun angle provide an abundance of radiant energy that overheats most buildings. In contrast, the winter sun although providing more intense radiation, is visible for a much shorter period of time than the summer sun, due to the low winter sun angle. A good use of solar energy is to maximize the access of winter sunlight into a home, for example, to provide light and warmth while limiting the input of summer sunlight and its occasionally burdensome heat.

It has therefore been a goal of the solar energy industry to provide an apparatus which can selectively reject or admit sunlight automatically, passively, and on a continuous year round basis. Many patents have been directed to apparatus which collect and trap the greatest degree of sunlight possible in order to tap the collected radiant energy. Examples of such apparatus are found in U.S. Pat. Nos. 4,078,603 and 4,076,015 which show collecting means with faces having angularly disposed reflective surfaces. Another example of a collecting means is U.S. Pat. No. 4,137,901 in which a water filled pan with a black bottom is partially enclosed with a reflective housing. U.S. Pat. No. 4,143,492 discloses a saw-tooth-configured member that admits sunlight striking the same at a predetermined angle while blocking sunlight not at that angle.

Glazing material of the subject invention automatically and continually controls the level of radiant solar energy passing therethrough by selectively admitting, rejecting or absorbing radiant solar energy striking the surface thereof.

It is an object of the invention to provide a glazing material which is versatile in its application. It is also an object of this invention to provide a glazing material which will provide a means of preventing overheating of a solar collector that is subject to failure due to a loss of electric power in full sunshine. For example, the collector found in West German Pat. No. 2,552,598 showing alternate reflective and absorbent surfaces uses the reflective areas to boost the solar flux falling upon the absorbing areas thus increasing the likelihood of absorber degradation or failure. The reflective areas of the glazing in this invention, on the other hand, would be used to reflect away radiation to prevent summer overheating that is permitted with the plain glass glazing of the device in West German Pat. No. 2,552,598 or any common flat plate collector. Additionally, the glazing of this invention can be used on east or west facing surfaces or windows to reject low angle summer radiation in the morning or evening thus reducing air-conditioning costs while also permitting low angle winter radiation originating from the south to enter freely and thus reduce heating cost.

The importance of the dual nature of the opaque zones in the subject invention, whereby an absorptive coating followed by a reflective coating is applied to the shaped planar members, is illustrated when considering U.S. Pat. No. 4,076,015 which uses only a reflective principle and attempts to maximize collection with the reflected light. In this case the radiation reflected simply enters an adjacent aperture of the light pyramid and reflects again off the back side of the next reflector thus substituting for the radiation being reflected from the top side of that zone. The result is simply to shift the light from the one reflective zone to the shadow created by the adjacent reflective zone. The reflective zones of U.S. Pat. No. 4,076,015 do nothing to increase collection and more output would result from leaving all zones transparent. The opaque zones of the subject invention, on the other hand, are equivalent to an absorbing "un-mirror" with a reflective backing. Further the energy absorbed by the coating is conducted to the outdoor air as the least path of thermal resistance rather than conducting through the glazing to the area being protected from overheating.

Another device in U.S. Pat. No. 4,257,403 (French, Chevalier) uses only transparent and absorbing surfaces with an ineffective shape as a shade because of the lenticonic aperture. In this case the collection may be improved by the scolloped shape of the opaque zones seriously reduces effectiveness. Furthermore, the opaque zones are insulated so that energy absorbed by the opaque zones is trapped inside the overall device. The device may have stopped the collector absorber from receiving some radiation, but it is unlikely that the amount of shading accomplished would properly protect the overall device from overhearing upon loss of power in full sunshine.

In the subject invention the absorbing surface may be any material such as light green paint known to be a reasonable absorber, a highly absorptive coating such as chrome-oxide on copper or a selective paint with absorptivity in the 0.8 range and emissivity in the 0.3 range. A black tape with a metallized aluminum coating would be equally functional and effective. the glazing. The opaque zone selectively absorbs or reflects radiant solar energy entering this zone depending on the manner in which the glazing is mounted relative to the sun and the angle of incidence of the radiant solar energy relative to the glazing. The planar member defining the opaque zone consists of a first layer of absorptive material applied to one surface of the planar member and a second layer of reflective material applied to the planar member and arranged so that the reflective material is always between the absorptive layer and source of the radiant solar energy.

According to the glazing of the subject invention, the exterior surface of the glazing, that is, the side of the glazing facing toward the source of the radiant energy appears as alternating strips of transparent material and reflective material. The opposite or interior side of the glazing consists of alternating strips of transparent material and absorptive material.

BRIEF DESCRIPTION OF THE DRAWINGS

FIG. 1 is a detailed side elevation view of one embodiment of a section of glazing material incorporating the features of the subject invention;

FIG. 2 is a front elevation view of a glazing panel mounted in a frame;

FIG. 3a is a side elevation cross-sectional view of another embodiment of the glazing material incorporating the features of the subject invention in a dual glazing panel;

FIG. 3b is a side elevational cross-sectional view of an alternative embodiment of the dual glazing panel of FIG. 3a;

FIG. 3c is a side elevation cross-sectional view of an alternative embodiment of the dual glazing panel of FIG. 3a;

FIG. 4 is a side elevation cross-sectional view of still another embodiment of the glazing material incorporating the features of the subject invention in a dual glazing panel;

FIG. 5 is a side elevation view of another embodiment of a glazing panel incorporating the features of the subject invention;

FIG. 6 is a side elevation view of the glazing material of this invention positioned to permit maximum acceptance of low winter sunlight and maximum rejection of high summer sunlight;

FIG. 7 is a side elevation view of the glazing material of this invention positioned to permit maximum uplighting and acceptance of low winter sunlight and maximum rejection of high summer sunlight;

FIG. 8 is a side elevation view of the glazing material of this invention when utilized as a greenhouse glazing; and FIG. 9 illustrates, in side elevation view, the glazing material of FIG. 6 employed as glazing for a south facing passive masonry wall, which can be dual glazed with an additional heat-trap film or the glazing of FIGS. 3a through 3c and 4.

DETAILED DESCRIPTION OF THE PREFERRED EMBODIMENTS

Referring now to FIG. 1 of the drawings, a section of the glazing material incorporating the features of this invention is indicated generally by the reference character 1. The glazing may be integrally manufactured from a material which renders a transparent glass-like final product. The glazing material 1 consists of a first series of planar members 3 and a second series of planar members 5. Only one planar member from each of said series is completely illustrated in FIG. 1. Planar members 3 and 5 are alternately disposed along a common plane indicated by the dash-dot line 7 in an angled relation to each other. The planar members and the common plane form a continuum of triangles in which the common plane is usually the hypotenuse, the planar member 3 is one side and the planar member 5 is the other side. The first angle A of the triangle, at the point of intersection of the planar member 3 and the common plane 7 is in the range of between about 15° to about 60°. The second angle B of the triangle, at the point of intersection of the planar member 5 and the common plane 7 is in the range of between about 30° to 90°. The third angle C of the triangle, where planar members 3 and 5 intersect to complete the triangle is in the range of between about 60° to 120°. As will become obvious to those skilled in the art, the range of angles employed permits the glazing material to be constructed for optimum effectiveness in a variety of geographical regions.

The first series of planar members 3 defines a transparent zone through which radiant solar energy is admitted and the second series of planar members 5 defines, at least in a portion thereof, an opaque zone where radiant solar energy is selectively absorbed or reflected. Planar member 5 has a coating of dark absorbtive material 9 facing inwardly toward the common plane 7 and a coating of reflective material 11 facing outwardly from the triangle toward the source of radiant energy, be that source direct or reflected sunlight. While it is possible to apply the absorbtive material on one face of the planar member and the reflective material on the other face of the planar member, preferably, the asborbtive coating 9 is layered between the planar member 5 and the reflective material 11. Black paint or the like may be applied to the outer face of the planar member to form the absorptive layer and aluminum paint applied to the cured layer of black paint to form the reflective layer. Alternatively, it is possible to apply a strip of highly reflective material or the like over the absorptive layer of material.

While the drawings illustrate the transparent zone 13 to consist solely of the area of planar member 3 and the opaque zone 15 to encompass all of the planar member 5, it is possible to enlarge the transparent zone 13 by only coating a portion of the planar member 5 with the absorptive and reflective material. This could be accomplished by applying the coating of materials to the planar member 5 beginning at the edge of the planar member which is adjacent the common plane 7 and continuing towards yet terminating short of the edge of the planar member 5 which defines one side of the angle C. An area of planar member 5 adjacent angle C would be transparent and thus a greater amount of radiant energy would be admitted by the glazing material.

Considering both FIGS. 1 and 2, the continuum of right angle triangles defined by the alternating series of planar members 3 and 5 form alternating transparent zones 13 and opaque zones 15 respectively along the glazing 1. The glazing may be manufactured to include extension members 17 extending therefrom to aid in securing the glazing in a mounting means such as a frame 19, or the like.

Turning now to FIG. 3a, the glazing material 1 includes a transparent spaced planar member 21a mounted in a spaced relation to the continuum of planar members 3 and 5, by means of side members 23a along both the horizontal and vertical edges of the glazing material. The spaced planar member 21a is generally parallel with the common plane 7. This embodiment provides a single insulating air pocket 25a in the dual glazing panel 27a which can be readily employed as an exterior window.

FIG. 3b shows an alternative embodiment of the dual glazing panel 27b of FIG. 3a. The alternative dual glazing panel 27b includes a spaced transparent planar member 21b which is in a spaced, generally parallel relation to the common plane 7. Side members 23b extend along both the horizontal and vertical edges of the panel 27b. A plurality of partitions 29b are spaced within the dual glazing panel 27b and extend perpendicularly from the spaced transparent planar member to the glazing at a point where the members of the first and second series of planar members intersect with the common plane 7. This configuration renders a series of insulating air pockets 25b in a dual glazing panel 27b.

A variation of the embodiment of the dual glazing panel of FIG. 3b is shown in FIG. 3c and indicated generally by the reference character 27c. Here again a series of insulating air pockets 25c are formed by partition 29c which extend from the glazing panel in the same plane as the planar members 5 and intersect the spaced planar member 21c at an acute angle. Side members 23c may extend along both the horizontal and vertical edges of the glazing material.

FIG. 4 shows an alternative embodiment of the dual glazing which utilizes a series of angularly disposed planar member 29 which, together with the planar members 3 and 5, form four sides of the insulating air pockets 25. The vertical edges of the panel would, of course, have side members which may be integral with the dual glazing panel 27 in order to completely enclose the air pocket. This embodiment of the dual glazing panel 27 may also be formed from two single panels of the present invention. For example, a panel 1, as shown in FIG. 6, could be combined with a similar glazing panel 1 which has been rotated 180° both vertically and horizontally so that the transparent zones 13 would be in an essentially parallel relationship with each other. Two glazing panels so mounted would provide a series of elongated air pockets in a dual glazing panel when mounted so that the planar members of each panel intersecting the common plane, are contiguous with one another.

In FIG. 5 an alternative embodiment of a glazing panel incorporating the features of the subject invention is indicated generally by the reference character 31 and is manufactured from a sheet of glass 33. One face of the glass as at 35 is serrated to provide planar members which define transparent zones 13 and opaque zones 15. It will, of course, be necessary in this embodiment to apply both the absorptive layer 9 and the reflective layer 11 to the same face of the planar member defining the opaque zone 15.

It should be readily clear to those skilled in the art that while, in one embodiment, the planar members of the transparent zone are approximately two inches high and the planar members forming the opaque zone about one inch high, with the triangle formed thereby being a 30-60-90 right angle triangle, these dimensions and the overall dimensions of a sheet of glazing material will, of necessity, be determined by its particular application. It is convenient to manufacture the glazing in panels which may be used individually as illustrated or framed together to cover a larger area.

APPLICATION OF THE INVENTION

Because of the versatility of the subject invention, several uses of the glazing material will be demonstrated. The glazing material serves a two fold purpose in that on the one hand it can selectively admit radiant solar energy while on the other hand it can selectively reject the same. It is possible to mount the glazing vertically, horizontally or diagonally and to use the glazing as, for example, a window glazing, the glazing of a solar energy collector, or a passive radiant energy collection panel for masonry walls. To more clearly understand a few of the specific uses of the glazing, attention is directed to FIGS. 6 through 9.

In FIG. 6, the glazing is positioned in a southerly facing direction to the Northern Hemisphere. Radiant solar energy will pass through the transparent zones of the glazing. The angle of incidence needed for the admittance of sunlight would occur when the sun is low on the horizon such as in the winter. During the winter, the amount of light admitted by the glazing is maximized by the reflective material of the opaque zone. Not only is the low winter sun gaining admittance through the transparent zone, but radiant energy reflected from winter snow, for example, would strike the reflective material 11 and then pass through the transparent zone 13. In the summer, the radiant energy of the high summer sun will pass through the transparent zone 13 and strike the absorptive layer 9 from which energy will be dissipated through the reflective side of the glazing. Thus the heat of the high summer is effectively rejected to the outside ambient air by the glazing while the low winter sunlight is admitted and the radiant heat put to a useful purpose.

Turning now to FIG. 7, the glazing is once again shown to be southerly facing. The glazing material is now configured as a window glazing which employs the available sunlight for indirect ceiling light. The glazing material 1 has been rotated 180° so that the reflective material 11 of the opaque zone 15 now faces in a generally upward direction whereas the application of the glazing as discussed with FIG. 6 employs the reflective material in a generally downward direction. The orientation of the glazing to the sun as shown in FIG. 7 reflects most of the spring, winter and fall sunlight upwardly toward the ceiling of a room to provide that room with ceiling light. At the same time, however, the glazing continues to reject much of the intense direct summer sun which strikes the reflective material 11 and is directed out away from the glazing, however, sky radiation and light from nearby landscape still enters the transparent zones.

The glazing panel of FIG. 2 would be rotated 180° so that the opaque zone 15 would be the first solar selection surface at the top of the glazing panel after extension member 17 in order to provide the glazing of FIG. 7.

FIG. 8 shows the present invention as a greenhouse glazing which can easily serve as the exterior membrane of a greenhouse or be retrofitted onto an existing structure. The glazing is angled so that the members which define the transparent zone are generally perpendicular to the hozizontal as at "H". The light of the high summer sun is reflected away from the glazing or absorbed by the dark material of the opaque zone 15. The light of the morning and evening and the low winter sun has maximum access to the greenhouse through the transparent zone 13. When used in this manner, the glazing will effectively reject the damaging rays of the summer sun. This rejection of the sun protects the greenhouse from the significant danger of overheating in the summer and eliminates the need for ventilation fans and the energy to power them.

In FIG. 9 a glazing panel 1, employing the principles described in the discussion of the application of the invention in FIG. 6, is mounted onto a south facing passive masonry wall 37. The use of the glazing material with a masonry wall will reduce the amount of radiant energy which such walls generally absorb and dissipate into the interior of a structure, and provide an insulating pocket of air 39 between the wall and the glazing. Moreover, a dual glazing effect can be achieved by placing a heat trap film 41 on the masonry wall between the wall and the glazing or by employing a glazing material of the embodiment illustrated in FIGS. 3a through 3c and FIG. 4.

What has been disclosed is a glazing material which is versatile in application and which selectively admits, rejects or absorbs radiant solar energy.

What is claimed is:

1. An apparatus for the selected admittance, absorption and reflection of radiant solar energy from a source thereof depending on the angle of incidence of said radiant solar energy relative to said apparatus, comprising: a first series of parallel planar members and a second series of parallel planar members contiguously and alternatively disposed along a common plane in an angled relation to each other; with one planar member from both of said series of planar members together with the common plane along which said members are angularly disposed forming a continuum of triangles in which the first angle of the triangle at the point of intersection of said planar member from the first series with said common plane is in the range of between about 15° to 60°, the second angle of the triangle, at the point of intersection of said planar member from said second series with said common plane is in the range of between about 30° to 90° and the third angle of the triangle is between about 60° to 120°; one of said series of members defining a transparent zone for admittance therethrough of radiant solar energy and the other of said series of planar members manufactured from a transparent material, and defining in at least a portion thereof, an opaque zone including a radiant solar energy absorbing material on one side thereof and a radiant solar energy reflecting material thereon between said absorbing material and the source of radiant solar energy, whereby radiant solar energy contacting one side of said planar members in said opaque zone is absorbed and radiant solar energy contacting the opposite side thereof is reflected; and a spaced transparent planar member mounted in a spaced relation with the first and second series of planar members, said spaced transparent planar member being generally parallel with the common plane.

2. An apparatus for the selected admittance, absorption and reflection of radiant solar energy from a source thereof depending on the angle of incidence of said radiant solar energy relative to said apparatus, comprising: a first series of parallel planar members and a second series of parallel planar members contiguously and alternately disposed along a common plane in an angled relation to each other; with one planar member from both of said series of planar members together with the common plane along which said members are angularly disposed forming a continuum of triangles in which the first angle of the triangle at the point of intersection of said planar member from the first series with said common plane is in the range of between about 15° to 60°, the second angle of the triangle, at the point of intersection of said planar member from said second series with said common plane is in the range of between about 30° to 90° and the third angle of the triangle is between about 60° to 120°; one of said series of members defining a transparent zone for admittance therethrough of radiant solar energy and the other of said series of planar members manufactured from a transparent material, and defining in at least a portion thereof, an opaque zone including a radiant solar energy absorbing material on one side thereof and a radiant solar energy reflecting material thereon between said absorbing material and the source of radiant solar energy, whereby radiant solar energy contacting one side of said planar members in said opaque zone is absorbed and radiant solar energy contacting the opposite side thereof is reflected; and a transparent member defining a second continuum of triangles formed by alternating planar members, the common plane wherein said transparent member is mounted being in an opposed relation with the first and second planar members, so that the angles of said second continuum of triangles adjacent the common plane and the points of intersection of the first and second planar members with the common plane are contiguous with each other thus forming a dual glazing panel.

3. The apparatus of claim 1 wherein horizontal and vertical side members extend between the transparent planar member and the first and second series of planar members and provide an enclosed isolated space therebetween.

4. The apparatus of claim 3 wherein spacing members extend from the transparent planar member to the common plane at a point where the members of the first and second series of planar members intersect said common plane.

5. The apparatus of claim 4 wherein the spacing members are perpendicular with the transparent planar member.

6. The apparatus of claim 4 wherein the spacing members intersect the spaced transparent planar member at an acute angle therewith.

7. The apparatus of claim 2 wherein vertical side members extend between the transparent member and the first and second series of planar members to enclose the dual glazing panel thus forming a plurality of elongated air pockets therein.

* * * * *